United States Patent [19]

McConnell et al.

[11] 3,984,227

[45] Oct. 5, 1976

[54] AMMONIA SOLUTIONS OF SODIUM AZIDE

[75] Inventors: William C. McConnell, Griffin, Ga.; Henry W. Rahn, Pittsburgh, Pa.

[73] Assignee: PPG Industries, Inc., Pittsburgh, Pa.

[22] Filed: Apr. 5, 1972

[21] Appl. No.: 241,395

Related U.S. Application Data

[60] Continuation of Ser. No. 22,099, March 23, 1970, abandoned, and a continuation-in-part of Ser. No. 814,838, April 9, 1969, abandoned, said Ser. No. 22,099, is a continuation-in-part of Ser. No. 814,838, which is a continuation-in-part of Ser. No. 755,765, Aug. 26, 1968, abandoned, Ser. No. 659,033, Aug. 8, 1967, Pat. No. 3,449,108, and Ser. No. 645,069, Feb. 10, 1967, abandoned, said Ser. No. 755,765, is a continuation of Ser. No. 632,478, Feb. 13, 1967, abandoned, which is a division of Ser. No. 400,216, Sept. 29, 1964, Pat. No. 3,376,125, said Ser. No. 659,033, is a continuation-in-part of Ser. No. 400,216, and a continuation-in-part of Ser. No. 605,200, Dec. 28, 1966, Pat. No. 3,376,126, which is a continuation of Ser. No. 358,121, April 7, 1964, abandoned, said Ser. No. 645,069, is a division of Ser. No. 358,121.

[52] U.S. Cl. ................................................. 71/65
[51] Int. Cl.$^2$ ........................................... A01N 7/00
[58] Field of Search ........................................ 71/65

[56] References Cited
FOREIGN PATENTS OR APPLICATIONS
1,456,699    9/1966    France .................................. 71/65

*Primary Examiner*—Glennon H. Hollrah
*Attorney, Agent, or Firm*—Mark Levin; George D. Morris

[57] ABSTRACT

Desirable herbicidal and fertilizing effects are obtained by applying to soil an effective amount of a mixture of sodium azide with ammonia. Anhydrous or water-containing solutions of sodium azide in ammonia may be used.

4 Claims, No Drawings

AMMONIA SOLUTIONS OF SODIUM AZIDE

RELATED APPLICATIONS

This application is a continuation of U.S. application Ser. No. 22,099, filed Mar. 23, 1970 now abandoned, which is a continuation-in-part of U.S. application Ser. No. 814,838, filed Apr. 9, 1969 now abandoned, which is:
1. a continuation-in-part of U.S. application Ser. No. 755,765, filed Aug. 26, 1968 now abandoned, which is a continuation of U.S. application Ser. No. 632,478, filed Feb. 13, 1967 now abandoned, which is a division of U.S. application Ser. No. 400,216, filed Sept. 29, 1964 now U.S. Pat. No. 3,376,125;
2. a continuation-in-part of U.S. application Ser. No. 659,033, filed Aug. 8, 1967 now U.S. Pat. No. 3,449,108, which is a continuation-in-part of U.S. application Ser. No. 400,216, filed Sept. 29, 1964 now U.S. Pat. No. 3,376,125, and a continuation-in-part of U.S. application Ser. No. 605,200, filed Dec. 28, 1966 now U.S. Pat. No. 3,376,126, which, in turn, is a continuation of U.S. application Ser. No. 358,121, filed Apr. 7, 1964 now abandoned; and
3. a continuation-in-part of U.S. application Ser. No. 645,069, filed Feb. 10, 1967 now abandoned, which is a division of U.S. application Ser. No. 358,121, filed Apr. 7, 1964 now abandoned.

This application is also a continuation-in-part of U.S. application Ser. No. 814,838, filed Apr. 9, 1969 now abandoned, which is:
1. a continuation-in-part of U.S. application Ser. No. 755,765, filed Aug. 26, 1968 now abandoned, which is a continuation of U.S. application Ser. No. 632,478, filed Feb. 13, 1967 now abandoned, which is a division of U.S. application Ser. No. 400,216, filed Sept. 29, 1964 now U.S. Pat. No. 3,376,125;
2. a continuation-in-part of U.S. application Ser. No. 659,033, filed Aug. 8, 1967 now U.S. Pat. No. 3,449,108, which is a continuation-in-part of U.S. application Ser. No. 400,216, filed Sept. 29, 1964 now U.S. Pat. No. 3,376,125, and a continuation-in-part of U.S. application Ser. No. 605,200, filed Dec. 28, 1966 now U.S. Pat. No. 3,376,126 which, in turn, is a continuation of U.S. application Ser. No. 358,121, filed Apr. 7, 1964 now abandoned; and
3. a continuation-in-part of U.S. application Ser. No. 645,069, filed Feb. 10, 1967 now abandoned, which is a division of U.S. application Ser. No. 358,121, filed Apr. 7, 1964 now abandoned.

THE INVENTION

This invention relates to the agricultural uses of azides. More particularly, it relates to an improved process for applying azide to the soil or to plants.

The alkali metal azides, ammonium azide, and the alkaline earth metal azides, particularly the azides of potassium and sodium, are useful as agricultural chemicals for the control of weeds and for defoliation purposes. Since these azides are quite potent as herbicides and defoliants, they are usually applied with large quantities of inert diluent. It has now been found that these azides may advantageously be applied to the soil or to plants in the form of an ammonia solution. The ammonia is preferably anhydrous but water may be present, if desired.

The solubility of the alkali metal azides in both liquid ammonia and water varies from moderate to substantial. Representative approximate values are shown in Table 1:

Table 1

| Approximate Solubility of Sodium and Potassium Azide Expressed As Grams of Salt per Hundred Grams of Solvent at 25°C. | | |
|---|---|---|
| | Solvent | |
| Salt | Liquid Ammonia | Water |
| $NaN_3$ | 48 | 41 |
| $KN_3$ | 5 | 54 |

Alkali metal azide decomposes when exposed to the soil. The time required for decomposition varies, but it is substantially completely decomposed in a few days or in a few weeks rarely in excess of 30 days after application. While it is not desired to be bound by any theory, it is believed that microorganisms commonly found in the soil decompose the azide into plant nutrients. Such factors as quantity of azide applied per unit area, population density of soil microorganisms, type of microorganism, temperature, moisture, and the chemical condition of the soil appear to affect the rate of decomposition. Ammonium azide and alkaline earth metal azides also appear to decompose when exposed to the soil.

This decomposition of azide may be exploited in treating the soil. Thus, in one embodiment of this invention, ammonia solution of at least one azide which may advantageously be lithium azide, sodium azide, potassium azide, rubidium azide, cesium azide, ammonium azide, beryllium azide, magnesium azide, calcium azide, strontium azide, or barium azide, is applied to the soil before sowing seed or planting crop plants. Solutions containing mixtures of azides may be used. Since the azide is a phytocide, particularly a herbicide, it kills weeds in the area of application. The soil takes up substantial portions of the ammonia for future use by the crop plants. In order to insure a high weed killing rate, the ammonia solution of azide applied may have an azide concentration which would prevent germination of the crop seed or growth of the crop plant, if these were present. After the azide concentration has decreased to a safe level, the crop seed or plants may be planted. Meanwhile, the weeds will have been effectively killed. Of course, the application rate of the ammonia and azide may be such that the initial azide concentration in the soil is well within the tolerable level of the crop seed or crop plant. Accordingly, the crop seed or plant may be planted after or concurrently with the application of the solution. Relatively low doses of lithium azide, sodium azide, potassium azide, rubidium azide, cesium azide, ammonium azide, beryllium azide, magnesium azide, calcium azide, strontium azide, or barium azide, i.e., about 2 to about 20 pounds per acre, are usually sufficient to inhibit effectively the growth of annual weed seeds. Crops can usually be planted within a short period, e.g., about 1 to about 5, rarely more than 10, days after application of these relatively low dosages of azide. When it is desired to kill well-established annuals or perennials or to effectively clean up an area of above-ground plants and seeds as well as underground seeds and roots, tubers, and other reproductive parts of both annual and perennial plants, higher application rates, e.g., about 25 to about 500 pounds per acre, are used. These high rates are also effective in killing woody plants, shrubs, and vines as well as fungi, nematodes, soil insects and microorganisms. High application rates of the above-enumerated alkali metal azides, ammonium azide, or alkaline earth metal azides are particularly useful in reclaiming patches of agricultural land which have succumbed to weeds and/or other pests. Well-established roots penetrating two or four feet or more into the ground are killed in this fashion. Rates in excess of 500 pounds per acre are within contemplation although seldom desirable because of economic considerations.

Another embodiment of this invention provides preemergence control of weeds. Here ammonia solution of at least one azide which may advantageously be lithium azide, sodium azide, potassium azide, rubidium azide, cesium azide, ammonium azide, beryllium azide, magnesium azide, calcium azide, strontium azide, or barium azide is applied to the soil subsequent to seeding, but prior to emergence of crop seedlings to the soil. In this fashion, weeds which are closer to the surface of the soil than are the crop plants are effectively eradicated. When the crop seeds are planted well beneath the surface of the earth, i.e., in excess of one to two inches, single application rates of the above-enumerated alkali metal azides, ammonium azide, or alkaline earth metal azides, as high as 25, rarely above 100, pounds per acre are useful. Typically, when the crop seeds are planted less than an inch beneath the surface of the earth, the recommended single application rate of these azides is less than about 25 pounds per acre, e.g., about 2 to about 20 pounds per acre. It is possible to use lower or higher rates of application and to rely upon the plurality of applications. In any event, the amount of ammonia and azide applied should be sufficient to inhibit the growth of weeds without having an adverse effect on crop growth. Ammonia solutions containing a mixture of azides are also within contemplation.

According to a further embodiment of this invention, ammonia solution of at least one azide which may advantageously be lithium azide, sodium azide, potassium azide, rubidium azide, cesium azide, ammonium azide, beryllium azide, magnesium azide, calcium azide, strontium azide, or barium azide is applied to the soil after the crop plants have emerged. In this fashion, some families of weeds are selectively killed without significant damage to crop plants. Thus, it has been discovered that broadleaved plants are more susceptible to herbicidal activity of azide than are narrow-leaved grassy plants. Accordingly, azide may be applied to the crop plants to kill weeds, notably annual weeds, which are not so well established as crop plants. In mid-summer, for example, well-established crop plants often tolerate doses of alkali metal azide, ammonium azide, or alkaline earth metal azide of 200 pounds per acre or more. Significantly lower rates, e.g., about 2 to about 100 pounds per acre, are effective in killing weeds which have emerged significantly long after emergence of the crop plant. Thus, weeds which have emerged subsequent to a cultivation or herbicidal treatment of a plot of crop plants and have not yet developed well-established root systems are effectively and selectively killed out of a field of crop plants by application of dosages of azide well below the amounts tolerable to the crop plant. Where crop plants mature significantly more slowly than the weeds which infest the area in which they grow, azide is most advantageously applied soon after the weed emergence to the soil. Top-dress application and side-dress application are useful post-emergence treatments. Side-dressing is preferred, however. Mixtures of azides are also useful in this embodiment.

Generally speaking, the alkali metal azide, ammonium azide, and/or alkaline earth metal azide applied is in the range of from about 2 pounds per acre to about 500 pounds per acre. Often it is in the range of from about 2 pounds per acre to about 200 pounds per acre. More usually it falls in the range of from about 2 pounds per acre to about 100 pounds per acre. The concentration of alkali metal azide, ammonium azide, and/or alkaline earth metal azide in the ammonia solution is also subject to wide variance. Values ranging from a few parts per million, e.g., 2 parts per million, up to and including the solubility limit of azide in the solvent under ambient conditions, may be used. Values approaching the solubility limit are not ordinarily preferred, however, since a drop in temperature could result in precipitation of the azide. The lower values are especially useful in dilute solutions comprising irrigation water or spraying solution.

The equipment heretofore used to apply ammonia to the soil may be used to apply ammonia solution of azide to the soil. Thus, substantially anhydrous ammonia solution of azide may be applied using a tool bar applicator which draws one or more knives which have at least one injection port through the soil. Another method which may be used to advantage is plow-down application. Still another method is direct injection into the soil.

The tool bar applicator may also be used to apply aqueous ammonia solutions of azide. Similarly, plow-down application or direct injection may be used to advantage. Spraying is also useful. When spraying is used, it is preferred that the ammonia solution be substantially free of solid matter so as to avoid clogging of spray nozzles. Where irrigation is used in the preparation or treatment of a field, the azide and ammonia may be added to the water stream prior to its entering the field. The azide may be dissolved in water to form a solution which is then metered into the stream. It is not necessary to form a solution of the azide prior to adding the azide to the stream but this procedure is preferred since solutions are generally more accurately metered and mixed than are solids. The ammonia may be added to the stream as an aqueous solution or it may be introduced by bubbling ammonia gas or liquid directly into the stream. Similarly, a substantially anhydrous ammonia solution of azide may be injected into the stream.

The amount of ammonia applied to the soil may vary widely depending upon the crop involved, the nutritional effect desired, and the relative economics of the application. Ordinarily, at least about 2 pounds of ammonia are applied per acre. Heavy applications, i.e., about 250 pounds per acre, may be applied. The more usual range is about 20 to about 200 pounds per acre. Greater or lesser amounts may be used, if desired.

The concentration of ammonia in the ammonia solution of alkali metal azide, ammonium azide, and/or alkaline earth metal azide is also subject to wide variation. When the ammonia solution of alkali metal azide is substantially anhydrous, the ammonia will usually be present in major proportion. Indeed the solution may consist of only ammonia and an effective amount of azide. Other substances may be included in the solution, however. Thus, fertilizers, insecticides, nematicides, and fungicides, may be added when desired. Particularly advantageous additives are compounds of the micronutrients and phosphorous-containing compounds such as the phosphates. Many compounds such as urea and ammonium nitrate when added to the solution serve to reduce the vapor pressure of the ammonia. When the solution is added to the soil, these additives may also perform other functions, such as fertilization in the case of urea and ammonium nitrate.

Aqueous ammonia solutions may contain very little water or the water may be present in major amounts. When the solution is irrigation water, for example, the ammonia concentration is sometimes as low as about 5 parts per million. More usually, irrigation water contains ammonia in the range of about 30 parts per million to about 5,000 parts per million. More concentrated solutions are useful for other methods of applying aqueous ammonia solution of alkali metal azide, ammonium azide, and/or alkaline earth metal azide. Solutions having water concentrations ranging from very large, e.g., greater than about 95 percent, to very small, e.g., less than about 1 percent, may be applied by injection or by the use of a tool bar applicator. Solutions also may be applied by spraying. This is particularly useful when the spray heads are close to the ground. Of course, if crop plants are established, the ammonia concentration should not be so high as to cause significant injury.

The use of ammonia solution of alkali metal azide, ammonium azide, and/or alkaline earth metal azide provides several advantages. Among these are the avoidance of substantial non-homogeneous regions in the treated field such as occur when using powdered or granular fillers, such as silica, clay, talc, bentonite, diatomaceous earth, wood flower, attapulgite clay, corn cob, and sawdust. Azide treatment and ammonia treatment are accomplished simultaneously with only one application at that time rather than two. It is possible to avoid the application of solids while securing the benefits of both azide and ammonia treatments. This reduces plugging of nozzles, tubes, and orifices in application equipment. Nevertheless, solids may be placed in suspension in the solution if desired. The relative ease of accurately metering liquids as compared with distributing powder or granules provides a more uniform distribution of the azide. While water may be present in the solution, it is generally inert and expensive to transport and distribute. By virtue of the instant invention, an option is given as to the amount of inert materials used to dilute the azide yet still provide for its uniform distribution. Indeed, there is often no need for any inerts to be present as, for example, when the solution consists essentially of ammonia and at least one azide which may advantageously be lithium azide, sodium azide, potassium azide, rubidium azide, cesium azide, ammonium azide, beryllium azide, magnesium azide, calcium azide, strontium azide, or barium azide. Nevertheless, when other factors dictate, inerts such as water may be present, if desired. It may be seen that flexibility in the compounding and application of these solutions is a major advantage of this invention.

It has also been found that the presence of azide, particularly alkali metal azide, suppresses nitrification. Nitrification is the conversion of compounds or ions such as $NH_3$, $NH_4^+$, urea, calcium cyanamide, proteins, compost, and decaying vegetative matter into nitrate and/or nitrite usually by the action of bacteria. Nitrification also includes the formation of nitrate from nitrite. Plants take up nitrogen mainly in the nitrate form or ammonium form. Some plants favor one of these forms over the other at different stages of growth. Cotton, corn, and wheat seedlings and young plants have been reported to absorb more ammonium nitrogen than nitrate nitrogen until they are 3 to 5 weeks old. Both forms of nitrogen are taken up when they are 4 to 8 weeks old. The ammonium ion is adsorbed by or chemically combined with the soil much more readily than is the nitrate ion. This means that the nitrate ion is much more mobile in the soil than the ammonium ion. When too much water is present in the field, as, for example, after a large thunderstorm, nitrate is easily leached away. Thus, while it is desirable to maintain nitrate nitrogen in the soil, it is also desirable to suppress nitrification of the less mobile forms of nitrogen so that the supply of nitrate in the soil is being steadily replenished over a long period of time. This allows the retention of a greater proportion of available nitrogen in the field. The presence of azide serves to effectively reduce the rate of nitrification, particularly of the ammonia concurrently applied, to achieve this result.

The presence of azide, particularly alkali metal azides such as those of sodium and potassium, in aqueous solutions of ammonia and alkali azide is also effective in reducing nitrite formation. Nitrates are not ordinarily harmful to animal life but the presence of nitrites can induce nitrite poisoning. Small amounts of azide, which are tolerable by the animal life, effectively suppress the reduction of nitrate to nitrite and the oxidation of ammonium nitrogen to nitrite. Thus, wild life, livestock, and domestic animals are protected from the harmful effects which can result from the presence of convertible nitrate nitrogen and ammonium nitrogen in bodies of water. The combined presence of ammonia and azide in irrigation water is especially beneficial in this respect.

Ammonia solutions of alkali metal azide also exhibit nematicidal, fungicidal, bacterial, rodenticidal, miticidal, and insecticidal properties and may be applied for any of these purposes. They are also effective in controlling certain algae and aquatic weeds. Molds and mildews are effectively destroyed by these solutions.

Ammonia solutions of alkali metal azide, ammonium azide, and/or alkaline earth metal azide, which solutions are preferably substantially anhydrous, may also be introduced to the foliage of plants for defoliation and/or desiccation purposes. Cotton is especially suitable for defoliation by treatment with these solutions. They may also be introduced to harvested produce such as fruit or berries, vegetables or grain to protect them from molds, rodents, bacteria, fungi, and insects.

While lithium azide, sodium azide, potassium azide, rubidium azide, and cesium azide, or mixtures thereof, may be used in the practice of this invention, the azides of sodium and potassium are preferred. Particularly preferred is potassium azide because its decomposition released potassium to the soil as well as nitrogen. Since potassium is an essential nutrient for plant growth and development, the decomposition products of potassium azide are especially desirable.

Ammonium azide is also particularly useful in the practice of this invention because it provides ammonium ion to the soil as well as nitrogen resulting from the decomposition of the azide ion. Thus, ammonium azide is advantageously used where a source of nitrogen is desired and where the presence of alkali metal ions or alkaline earth metal ions is not desired.

Beryllium azide, magnesium azide, calcium azide, strontium azide, and barium azide are suitable for use in this invention. Of these, magnesium azide, calcium azide, strontium azide, and barium azide are preferred because of the scarcity of beryllium azide. Magnesium azide and calcium azide are especially preferred.

Ammonia solutions of azide may be prepared in various ways. The azide salt may be dissolved in ammonia. Where water is to be present in the solution the azide may be dissolved in the ammonia and the solution combined with water. Alternatively, an aqueous solution of the azide may be combined with ammonia. It is also possible to provide precursors to the ammonia which will yield dissolved azide. Thus, nitrous oxide may be reacted with the appropriate amide which has been dissolved or produced in ammonia. As an example, nitrous oxide may be reacted with potassium amide dissolved in liquid ammonia to produce an ammonia solution of potassium azide. Hydrazoic acid may be combined directly with an excess of ammonia to provide an ammonia solution of ammonium azide. If an aqueous solution is desired, an aqueous solution of hydrazoic acid may be combined with the ammonia or water may be added to an ammonia solution of ammonium azide.

In order to achieve a balanced fertilizer effect upon decomposition of the azide, additional plant nutrients, including the micronutrients, may be admixed with the ammonia solution of the azide prior to applying the solution to the soil. These materials are preferably soluble in the solution. Examples of these materials are phosphorus-containing plant foods, compounds of sulfur, boron, zinc, calcium, vanadium, molybdenum, copper, iron, magnesium, cobalt, and manganese. Specific examples include potassium phosphate, ammonium thiosulfate, sodium borate, zinc sulfate, and copper sulfate. The solubility of many compounds may be enhanced by the presence of water.

The basic principles of the present invention have been incorporated by way of example in the following specific embodiments.

EXAMPLE I

Four plots of Ohio loam soil were staked, measured, and labeled plots A, B, C, and D respectively. In the spring, 66 days before planting, anhydrous ammonia and potassium azide were mixed together to form a solution. This solution was applied to plot A using shank injectors. On the same day granules containing 10 percent potassium azide were applied to plot B with a shoulder-type cyclone seeder and were incorporated into the soil by disc tillage. Thirty-one days prior to planting, anhydrous ammonia was applied to plot C using shank injectors. Two days later, granules containing 10 percent $KN_3$ were applied to the soil of plot D. These granules were incorporated into the soil by disc tillage. On the day of planting, plots A, B, C, and D and an adjacent field were planted in soybeans. One hundred pounds per acre of 5-20-28 blended solid fertilizer was applied side banded, two inches to the side and two inches below the seed during planting. Thirty-six days after planting, there was no difference in appearance of the soybeans over the entire field. On the 106th and 107th days after planting, soybean pods were hand picked from 10 foot lengths of two rows representing approximately 0.015 acre in each of plots A, B, C, and D and the untreated adjacent area. These pods were hand hulled and cleaned. The plot sizes, ammonia and potassium azide application rates, and soybean yields are shown in Table 2.

Table 2

| PLOT | MEASUREMENTS Ft × Ft | APPLICATION, LB/A $NH_3$ | $KN_3$ | SOYBEAN YIELD Bu/A |
|---|---|---|---|---|
| A | 32 × 132 | 125 | 4.75 | 89.8 |
| B | 66 × 132 | — | 5 | 89 |
| C | 32 × 132 | 125 | — | 78 |
| D | 66 × 66 | — | 10 | 70.3 |
| Control | — | — | — | 57.8 |

EXAMPLE II

Three plots of Ohio loam soil were staked, measured, and labeled plots A, B, and C, respectively. In the spring, 40 days before planting, anhydrous ammonia and potassium azide were mixed together to form a solution. This solution was applied in differing amounts to plots A and B using shank injectors. Five days before planting, anhydrous ammonia was applied to plot C using shank injectors. On the day of planting, plots A, B, and C and an adjoining field were planted in corn. Two hundred pounds per acre of 8-28-8 blended solid fertilizer was applied, side banded, two inches to the side and two inches below the seed during planting. Sixty-two days after planting, the corn plants on plots A, B, and C appeared to be taller and appeared to be greener than the plants on the untreated area. Seventy-six days after planting, the corn plants on plots A and B appeared to be a darker green than the corn plants on plot C, and the corn plants on the untreated control showed pronounced nitrogen starvation. At this time, a corn stalk was taken from each of the plots A, B, and C and the control field. Each stalk was split above and below an ear and nitrate test powder was applied thereto. The stalk from plot A showed a pronounced color change (light pink) below the ear indicating the presence of nitrate in that area. No color change was observed above the ear. The stalk from plot B showed a pronounced color change (dark pink to red) below the ear and a slight color change (very light pink) above the ear. The stalk from plot C showed a slight color change (very light pink) below the ear and no color change above the ear. Two stalks cut from the untreated field showed no observable color change above or below the ear. On the 182nd day after planting, the corn was hand harvested from 4 rows, 33 feet long representing approximately 0.01 acre in each of plots A, B, and C and the untreated adjacent area. Yields were standardized to 15.5 percent moisture. The plot sizes, ammonia and potassium azide application rates, and standardized corn yields are shown in Table 3.

Table 3

| PLOT | MEASUREMENTS Ft × Ft | APPLICATION, LB/A $NH_3$ | $KN_3$ | CORN YIELD Bu/A |
|---|---|---|---|---|
| A | 56 × 238 | 125 | 4.75 | 112.8 |
| B | 104 × 238 | 200 | 7.6 | 130.4 |
| C | 64 × 238 | 125 | — | 107.4 |
| Control | — | — | — | 93.7 |

From the foregoing, it is apparent that if proper care is exercised in preparing and handling solutions of sodium azide in anhydrous or aqueous ammonia, good pesticidal and fertilizing effects are obtained.

We claim:

1. A method of treating soil that comprises applying to said soil in an amount effective to produce herbicidal and fertilizing effects an admixture of sodium azide and ammonia.

2. A method as defined in claim 1 characterized in that said admixture is an ammonia solution of sodium azide.

3. A method as defined in claim 2, characterized in that said solution is substantially anhydrous.

4. A method as defined in claim 2, characterized in that said solution contains water.